(12) United States Patent
Cormier et al.

(10) Patent No.: US 8,019,018 B2
(45) Date of Patent: Sep. 13, 2011

(54) DETERMINING A MODE TO TRANSMIT DATA

(75) Inventors: Daniel R. Cormier, Anaheim, CA (US); Peter Do, La Mirada, CA (US); Alan V. Ly, Walnut, CA (US)

(73) Assignee: Powerwave Cognition, Inc., Santa Ana, CA (US)

( * ) Notice: Subject to any disclaimer, the term of this patent is extended or adjusted under 35 U.S.C. 154(b) by 1164 days.

(21) Appl. No.: 11/548,763

(22) Filed: Oct. 12, 2006

(65) Prior Publication Data

US 2008/0089398 A1 Apr. 17, 2008

(51) Int. Cl.
*H03K 9/00* (2006.01)
(52) U.S. Cl. ........ 375/316; 375/219; 375/220; 375/221; 375/222; 375/223; 455/73
(58) Field of Classification Search .................. 375/316, 375/219, 220, 221, 222, 223; 455/73
See application file for complete search history.

(56) References Cited

U.S. PATENT DOCUMENTS

| | | | |
|---|---|---|---|
| 5,742,593 A | 4/1998 | Sharony et al. | |
| 5,748,147 A | 5/1998 | Bickley et al. | |
| 6,084,919 A | 7/2000 | Kleider et al. | |
| 6,385,434 B1 | 5/2002 | Chuprun et al. | |
| 6,985,737 B2 | 1/2006 | Yamaguchi et al. | |
| 7,239,624 B2 | 7/2007 | Buchwald et al. | |
| 7,787,426 B2 | 8/2010 | Seidel et al. | |
| 2002/0012337 A1 | 1/2002 | Schmidl et al. | |
| 2003/0050012 A1 | 3/2003 | Black et al. | |
| 2003/0203721 A1 | 10/2003 | Berezdivin et al. | |
| 2003/0203735 A1 | 10/2003 | Andrus et al. | |
| 2003/0206561 A1 | 11/2003 | Schmidl et al. | |
| 2003/0210680 A1 | 11/2003 | Rao et al. | |
| 2004/0032847 A1 | 2/2004 | Cain | |
| 2004/0047324 A1 | 3/2004 | Diener | |
| 2004/0058679 A1 | 3/2004 | Dillinger et al. | |
| 2004/0085912 A1 | 5/2004 | Xu et al. | |
| 2004/0092281 A1 | 5/2004 | Burchfiel | |
| 2004/0110493 A1 | 6/2004 | Alvarez et al. | |
| 2004/0132496 A1* | 7/2004 | Kim et al. .................. 455/562.1 |
| 2004/0172476 A1 | 9/2004 | Chapweske | |
| 2004/0220995 A1 | 11/2004 | Tsutsumi | |
| 2004/0259503 A1 | 12/2004 | Ogura | |

(Continued)

FOREIGN PATENT DOCUMENTS

EP 1 178 625 2/2002

(Continued)

OTHER PUBLICATIONS

"International Search Report", ISR sent on Jun. 20, 2008 for PCT Application No. PCTUS2007021640, (Jun. 20, 2008).

(Continued)

*Primary Examiner* — Dac Ha
*Assistant Examiner* — Zewdu Kassa
(74) *Attorney, Agent, or Firm* — Strategic Patents, P.C.

(57) ABSTRACT

In one aspect, the invention is a method that includes transferring data at an initial mode from a transmitter to a receiver, determining a suggested mode based on the data transferred and determining a count of the data transferred from the transmitter to the receiver. The method also includes transferring the suggested mode and the count to the transmitter and determining a pending mode based on the suggested mode and the count.

27 Claims, 7 Drawing Sheets

U.S. PATENT DOCUMENTS

| | | | |
|---|---|---|---|
| 2005/0020293 A1 | 1/2005 | Moore | |
| 2005/0053032 A1* | 3/2005 | Itoh | 370/329 |
| 2005/0070294 A1 | 3/2005 | Lyle et al. | |
| 2005/0083876 A1 | 4/2005 | Vialen et al. | |
| 2005/0128998 A1* | 6/2005 | Jelitto et al. | 370/349 |
| 2005/0157678 A1 | 7/2005 | Mantha et al. | |
| 2005/0197118 A1 | 9/2005 | Mitchell | |
| 2005/0259724 A1 | 11/2005 | Bergstrom et al. | |
| 2005/0276317 A1* | 12/2005 | Jeong et al. | 375/213 |
| 2006/0035641 A1 | 2/2006 | Moon et al. | |
| 2006/0084444 A1 | 4/2006 | Kossi et al. | |
| 2006/0088010 A1 | 4/2006 | Buchwald et al. | |
| 2006/0126847 A1 | 6/2006 | Ho | |
| 2006/0142033 A1 | 6/2006 | Wolman et al. | |
| 2006/0146745 A1 | 7/2006 | Cai et al. | |
| 2006/0171332 A1 | 8/2006 | Barnum | |
| 2006/0198346 A1 | 9/2006 | Liu et al. | |
| 2006/0209762 A1 | 9/2006 | Talmola et al. | |
| 2006/0215605 A1 | 9/2006 | Srikrishna et al. | |
| 2006/0215611 A1 | 9/2006 | Nakagawa et al. | |
| 2006/0251019 A1 | 11/2006 | Dalsgaard et al. | |
| 2006/0268791 A1 | 11/2006 | Cheng et al. | |
| 2006/0268792 A1 | 11/2006 | Belcea | |
| 2006/0289650 A1 | 12/2006 | Taylor et al. | |
| 2007/0129011 A1 | 6/2007 | Lal et al. | |
| 2007/0211686 A1 | 9/2007 | Belcea et al. | |
| 2007/0237092 A1 | 10/2007 | Balachandran et al. | |
| 2007/0249341 A1 | 10/2007 | Chu et al. | |
| 2008/0095102 A1 | 4/2008 | Meng et al. | |
| 2008/0108358 A1 | 5/2008 | Patel et al. | |
| 2009/0298442 A1* | 12/2009 | Adkins | 455/73 |

FOREIGN PATENT DOCUMENTS

| | | |
|---|---|---|
| EP | 1178625 | 2/2002 |
| EP | 1178625 A2 | 2/2002 |
| EP | 1667372 | 6/2006 |
| JP | 2003 046595 | 2/2003 |
| JP | 2003046595 | 2/2003 |
| JP | 2003046595 A2 | 2/2003 |
| WO | WO-9939472 A1 | 8/1999 |
| WO | WO-2006/039800 A1 | 4/2006 |
| WO | WO-2008/121161 | 10/2008 |
| WO | WO-2008/127420 | 10/2008 |
| WO | WO-2008/127421 | 10/2008 |
| WO | WO-2008/140566 A2 | 11/2008 |
| WO | WO-2008/140566 A3 | 11/2008 |
| WO | WO-2008/140566 A9 | 11/2008 |
| WO | WO-2008/143695 A2 | 11/2008 |
| WO | WO-2008/147447 A2 | 12/2008 |
| WO | WO-2008/156498 A2 | 12/2008 |
| WO | WO-2008/156498 A3 | 12/2008 |
| WO | WO-2008/127421 A3 | 3/2009 |
| WO | WO-2008/147447 A3 | 2/2010 |
| WO | WO-2008/121161 A3 | 3/2010 |
| WO | WO-2008/143695 A3 | 3/2010 |

OTHER PUBLICATIONS

Notification of transmittal of the International Search Report dated Jun. 20, 2008, PCT/US2007/021640.

Written Opinion of the International Searching Authority dated Jun. 20, 2008, PCT/US2007/021640.

Lichun Bao, et. al., "Channel Access Scheduling in Ad Hoc Networks with Unidirectional Links", Computer Science Dept. and Computer Engineering Dept., University of CA, 2001.

Lichun Bao, et. al., "Hybrid Channel Access Scheduling in Ad Hoc Networks", Computer Science Dept. and Computer Engineering Dept., University of CA, 2002.

" U.S. Appl. No. 11/595,493, Non-Final Office Action mailed Dec. 29, 2009", U.S. Appl. No. 11/595,493 , 18 pgs.

"U.S. Appl. No. 11/595,717, Non-Final Office Action mailed Aug. 20, 2009", , 3 pgs.

"U.S. Appl. No. 11/595,719, Non-Final Office Action Jan. 27, 2010", , 29 Pgs.

"U.S. Appl. No. 11/595,719, Final Office Action mailed Jun. 19, 2009", U.S. Appl. No. 11/595,719 , 3 Pgs.

"U.S. Appl. No. 11/595,740,Non Final Office Action mailed Nov. 23, 2009", U.S. Appl. No. 11/595,740 , 11.

"U.S. Appl. No. 11/595,716, Final Office Action mailed Nov. 2, 2009", U.S. Appl. No. 11/595,716 , 26 Pgs.

"International Application Serial No. PCT/US2007/084371, Search Report and Written Opinion mailed Dec. 16, 2009", PCT/US2007/084371 , 12.

"International Application Serial No. PCT/US2007/084372, Search Report and Written Opinion mailed Dec. 16, 2009", PCT/US2007/084372 , 14 pgs.

"International Application Serial No. PCT/US2007/084376, Search Report and Written Opinion mailed Dec. 22, 2009", PCT/US2007/084376 , 12 pgs.

"Application Serial No. 11/595,719, NFOA, mailed Mar. 2, 2009", U.S. Appl. No. 11/595,719 , all.

"U.S. Appl. No. 11/595,716, NFOA, mailed Mar. 3, 2009", , all.

Akyildiz, I F. et al., "NeXt generation/dynamic spectrum access/cognitive radio wireless networks: A Survey", *Computer Networks* vol. 50. from COGN-0053-PWO ISR/WO of Nov. 20, 2009 May 17, 2006 , 2127-2159.

Dimou, K. et al., "Generic Link Layer: A Solution for Multi-Radio Transmission Diversity in Communication Networks beyond 3G", *2005 62nd Vehicular Technology Conference* Sep. 25-28, 2005 , 1672-1676.

ISR, , "International Search Report", PCT/US07/84374 Dec. 8, 2008 , all.

ISR, , "PCT/US2007/084370", Mar. 13, 2009.

ISR, , "PCT/US2007/084375", COGN-0017-PWO PCT Search Report Jan. 22, 2009 , all.

Jorgenson, M. et al., "Operation of the dynamic TDMA subnet relay system with HF bearers", *2005 IEEE Military Communications Conference*, vol. 1 Oct. 17-20, 2005 , 338-343.

Seidel, S. et al., "Autonomous dynamic spectrum access system behavior and performance", *In DySPAN 2005; First IEEE Symposium on new Frontiers in Dynamic Spectrum Access Networks* Nov. 2005 , 180-183.

Zhao, J et al., ""Distributed coordination in dynamic spectrum allocation networks"", *Proc. IEEE DySPAN 2005* Nov. 2005, 259-268.

"U.S. Appl. No. 11/595,740, Notice of Allowance mailed Apr. 15, 2010", , 16.

"U.S. Appl. No. 11/595,717, Final Office Action mailed Apr. 19, 2010", , 26.

"U.S. Appl. No. 11/595,719, Final Office Action mailed May 14, 2010", , 5.

USPTO Final Office Action, U.S. Appl. No. 11/595,493, mailed Jul. 16, 2010, all pages.

"U.S. Appl. No. 11/595,716, Non-Final Office Action mailed Jan. 6, 2011", , 23.

"U.S. Appl. No. 11/595,493, Final Office Action mailed Feb. 2, 2011", , 17.

Seidel, S. ""Autonomous dynamicspectrum access system behavior andperformance"", 2005 1st IEEE International Symposium on New Frontiers in Dynamic Spectrum Access Networks, Baltimore, MD, USA, Nov. 8, 2005 , 180-183.

Scott, D. ""IEEE 802 Tutorial: 1-15 Cognitive Radio",", IEEE, Piscataway, NJ, USA, [Online] URL :http://www.ieee802.org/802_tutorials/05-July/IEEE%20802%20CR%20Tutorial%207-18-0 5%20seidel%20input.pdf scott seidel raytheon tutorial Jul. 18, 2005 , 1-21.

"U.S. Appl. No. 11/595,719, Non-Final Office Action mailed Feb. 25, 2011", , 32.

"U.S. Appl. No. 11/595,717, Final Office Action mailed Apr. 14, 2011", , 24.

"U.S. Appl. No. 11/595,542, Non-Final Office Action mailed Oct. 4, 2010", , 20 pgs.

"U.S. Appl. No. 11/595,717, Non-Final Office Action mailed Sep. 24, 2010", , 23.

"U.S. Appl. No. 11/595,719, Non-Final Office Action mailed Sep. 2, 2010", , 3.

"U.S. Appl. No. 11/595,493, Non-Final Office Action mailed Sep. 22, 2010", , 17.

Zhi Tian, "A Wavelet Approach to Wideband Spectrum Sensing for Cognitive Radios", In: IEEE Cognitive Radio.Oriented Wireless Networks and Communicat i ons Jun. 8, 2006.

Cai Li, Guo "Investigation on Spectrum Sharing Technology Based on Cogni t i ve Radi o", In: IEEE ChinaCom'06 First International Conference on Comm. and Networking Oct. 25, 2006.

Lehtmiaki, Janne J. "Spectrum Sensing with Forward Methods", In: IEEE MILCOM 2006, Oct. 23, 2006.

"U.S. Appl. No. 11/595,719, Notice of Allowance mailed Apr. 21, 2011", ,5.

"U.S. Appl. No. 11/595,542, Final Office Action mailed May 12, 2011", ,15.

"International Application Serial No. PCT/US2007/084373, Search Report and Written Opinion mailed Apr. 14, 2011", ,9.

* cited by examiner

DETERMINING A MODE TO TRANSMIT DATA

GOVERNMENT SPONSORED RESEARCH

This invention was made with support of the United States Government under Contract MDA972-01-9-0022. The United States Government may have certain rights in the invention.

TECHNICAL FIELD

The invention relates to communications, and in particular, transmitting data.

BACKGROUND

In wireless networks, a fundamental trade-off is data rate versus range. Successful data transmission requires a transmitter to transmit a signal with an energy per bit that is large enough for a receiver to distinguish the signal from noise. Free space propagation causes energy of the signal to decay as inverse of the distance squared. Maintaining sufficient energy per bit such that the transmission is successful as the range is increased requires that either the power of the transmission be increased or the number of bits transmitted per unit time be decreased or a combination of both. In a hostile environment, increasing the power of the transmission increases the likelihood of being detected by an enemy so that one sacrifices throughput by using a lower data rate instead of increasing the power. Power levels may also be limited by available sources, such as batteries, vehicle power and so forth.

SUMMARY

In one aspect, the invention is a method that includes transferring data at an initial mode from a transmitter to a receiver, determining a suggested mode based on the data transferred and determining a count of the data transferred from the transmitter to the receiver. The method also includes transferring the suggested mode and the count to the transmitter and determining a pending mode based on the suggested mode and the count.

In another aspect, the invention is a receiver including circuitry configured to determine a suggested mode based on data received, to determine a count of the data transferred to the receiver and to send the suggested mode and the count to a transmitter.

In a further aspect, the invention is a transmitter including circuitry configured to send data at an initial mode and to determine a pending mode based on a suggested mode and a count.

In a still further aspect, the invention is an article including a machine-readable medium that stores executable instructions to determine a mode to transmit data. The instructions cause a machine to transfer data at an initial mode from a transmitter to a receiver, determine a suggested mode based on the data transferred, determine a count of the data transferred from the transmitter to the receiver, transfer the suggested mode and the count to the transmitter and determine a pending mode based on the suggested mode and the count.

DETAILED DESCRIPTION

Figure 1:
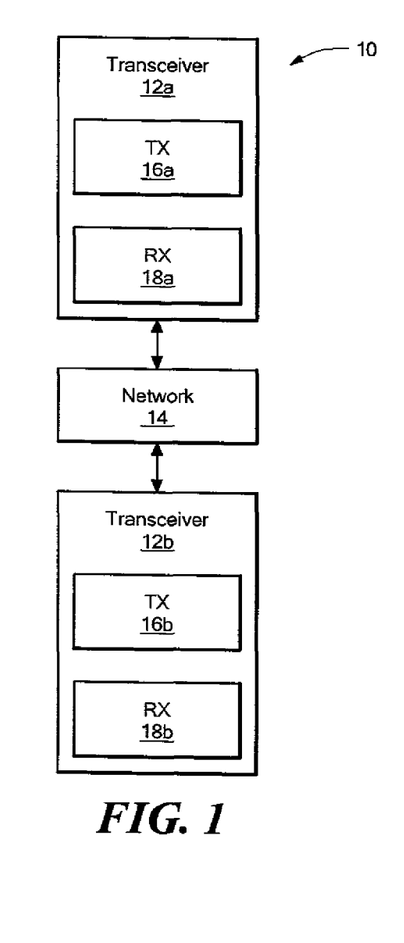
FIG. 1 is a diagram of a communications system.

Referring to FIG. 1, a communications system 10 includes transceivers (e.g., a transceiver 12a, a transceiver 12b) connected together by a network 14 (e.g., a wireless network). The transceivers 12a, 12b may be included in mobile units (not shown), for example, a car, a plane, a helicopter, and so forth.

The transceivers 12a, 12b include transmitters and receivers (e.g., transceiver 12a includes a transmitter 16a and a receiver 18a; transceiver 12b includes a transmitter 16b and a receiver 18b). When the transceiver 12a sends information to the transceiver 12b, a link is established through the network 14. The transmitter 16a sends data (e.g., data packets) to the receiver 18b over the link. In addition to the data sent, the transmitter 16a sends control data. For example, control data may include transceiver identification information, Global Positioning System (GPS) synchronizing data (e.g., GPS time), the number of data packets transmitted and so forth. Usually, the transmitter 16b will transmit control data back to the receiver 18a indicating how many data packets the receiver 18b received. Data transmission is typically broken up into a series of slots, representing fixed or variable units of time over which a particular transceiver may continuously transmit data. In a system for which Medium Access Control (MAC) is governed by Time Division Multiple Access (TDMA), each slot is generally fixed in period and takes up a fraction of a second in time. In other access schemes (e.g., Carrier Sense Multiple Access (CSMA)), the slot period may vary based on the medium access control protocol.

Data is transmitted across the link using a particular mode. As used herein, the term mode refers to a combination of a waveform/encoding method (e.g., Walsh5, Binary Phase Shift Keying (BPSK), Quadrature Phase Shift Keying (QPSK), and so forth) and a bandwidth being used to transmit the data. The bandwidth may be contiguous or may consist of a number N of non-contiguous sections of bandwidth. For example, there may be eight sections of 1.2 MHz bandwidth for a total bandwidth of 9.6 MHz. Each section must be located within the transceiver's operational band. Table I includes an exemplary list of modes. Control data is typically broadcast over a single mode called the control mode. In this example, the control mode is labeled W1 in Table I.

Table I further includes a waveform type, a number of sections, a data rate (in bits per slot), and a Required Signal Level indicator (RSLi) relative to a control mode for the Walsh5, BPSK, and QPSK modes. The RSLi is based on the signal strength measured at the receiver and corresponds to the signal necessary to achieve a fixed Bit Error Rate (BER). The required signal level (in dB) relative to the control mode (Walsh5 with Section 1) is $10 \log_{10}(N)$ dB for Walsh5, $10 \log_{10}(N)+6.3$ dB for BPSK, and $10 \log_{10}(2N)+6.3$ dB for QPSK, where N is the number of sections. In one example, the control mode requires a 6.7 dB signal-to-noise ratio (SNR) to achieve a BER of $10^{-5}$; this value corresponds to an RSLi of 0.

Any suitable subset of the modes described in Table I may be used. Table II shows an exemplary selection of modes for each of the possible bandwidth allocations and a corresponding set of RSLi values. Each mode allocated to a bandwidth in Table II corresponds to a Mode ID.

TABLE I

Exemplary Modes to Transmit Data

| Waveform | Sections | Mode | Rate (bits per slot) | RSL relative to Control (RSLi) (dB) |
|---|---|---|---|---|
| Walsh5 | 1 | W1 | 680 | 0 |
| Walsh5 | 2 | W2 | 1360 | 3.0 |
| Walsh5 | 3 | W3 | 2040 | 4.8 |
| Walsh5 | 4 | W4 | 2720 | 6.0 |
| Walsh5 | 5 | W5 | 3400 | 7.0 |
| Walsh5 | 6 | W6 | 4080 | 7.8 |
| Walsh5 | 7 | W7 | 4760 | 8.5 |
| Walsh5 | 8 | W8 | 5440 | 9.0 |
| BPSK | 1 | B1 | 3232 | 6.3 |
| BPSK | 2 | B2 | 6464 | 9.3 |
| BPSK | 3 | B3 | 9696 | 11.1 |
| BPSK | 4 | B4 | 12928 | 12.3 |
| BPSK | 5 | B5 | 16160 | 13.3 |
| BPSK | 6 | B6 | 19392 | 14.1 |
| BPSK | 7 | B7 | 22624 | 14.8 |
| BPSK | 8 | B8 | 25856 | 15.3 |
| QPSK | 1 | Q1 | 6464 | 9.3 |
| QPSK | 2 | Q2 | 12928 | 12.3 |
| QPSK | 3 | Q3 | 19392 | 14.1 |
| QPSK | 4 | Q4 | 25856 | 15.3 |
| QPSK | 5 | Q5 | 32320 | 16.3 |
| QPSK | 6 | Q6 | 38784 | 17.1 |
| QPSK | 7 | Q7 | 45248 | 17.8 |
| QPSK | 8 | Q8 | 58176 | 18.3 |

TABLE II

Exemplary Modes available for different Bandwidth Allocations

| Allocated Bandwidth | Modes | Mode ID | RSLi (dB) |
|---|---|---|---|
| 1.2 MHz | W1 | 1 | 0 |
|  | B1 | 2 | 6.3 |
|  | Q1 | 3 | 9.3 |
| 2.4 MHz | W1 | 1 | 0 |
|  | W1 | 2 | 3.0 |
|  | B1 | 3 | 6.3 |
|  | B2 | 4 | 9.3 |
|  | Q2 | 5 | 12.3 |
| 3.6 MHz | W1 | 1 | 0 |
|  | W2 | 2 | 3.0 |
|  | B1 | 3 | 6.3 |
|  | B2 | 4 | 9.3 |
|  | Q2 | 5 | 12.3 |
|  | Q3 | 6 | 14.1 |
| 4.8 MHz | W1 | 1 | 0 |
|  | W2 | 2 | 3.0 |
|  | B1 | 3 | 6.3 |
|  | B2 | 4 | 9.3 |
|  | B4 | 5 | 12.3 |
|  | Q4 | 6 | 15.3 |
| 6.0 MHz | W1 | 1 | 0 |
|  | W2 | 2 | 3.0 |
|  | B1 | 3 | 6.3 |
|  | B2 | 4 | 9.3 |
|  | B4 | 5 | 12.3 |
|  | Q4 | 6 | 15.3 |
|  | Q5 | 7 | 16.3 |
| 7.2 MHz | W1 | 1 | 0 |
|  | W2 | 2 | 3.0 |
|  | B1 | 3 | 6.3 |
|  | B2 | 4 | 9.3 |
|  | B4 | 5 | 12.3 |
|  | Q4 | 6 | 15.3 |
|  | Q6 | 7 | 17.1 |

Figure 2:
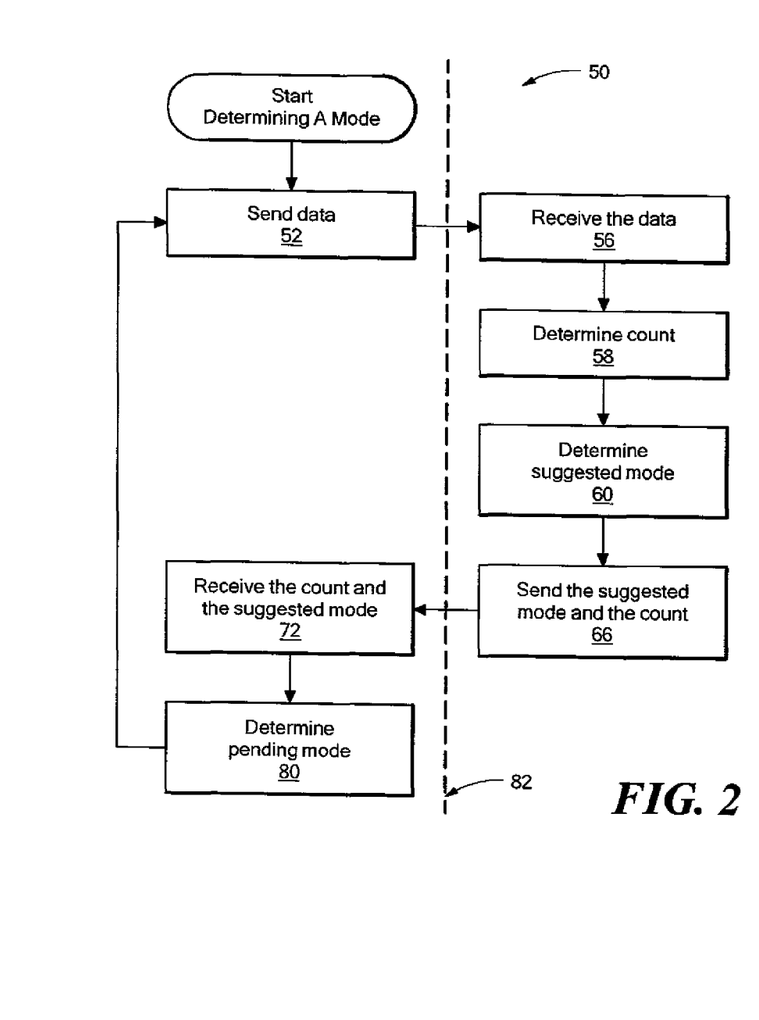
FIG. 2 is a flowchart of a process to determine a mode.

Referring to FIG. 2, in one example, a transmitter (e.g., the transmitter 16a or the transmitter 16b) is determining a mode to transmit data to a receiver (e.g., transmitter 16a determines a mode for transmitting to the receiver 18b, the transmitter 16b determines a mode for transmitting to the receiver 18a) using a process 50. In one example, for each one-second interval in GPS time, process 50 uses transmission quality data at the receiver, including SNR data and determines whether the data supports an increase in mode, a decrease in mode or no change and how large an increase or decrease may be made.

In one example, process blocks on a left side of a reference line 82 (e.g., processing blocks 52, 72 and 80) represent processes usually performed at the transmitter and process blocks on the right side of the reference line 82 (e.g., processing blocks 56, 58, 60 and 66) represent processes usually performed at the receiver.

Process 50 sends data to a receiver (52). For example, the transmitter 16a sends data at an initial mode to the receiver 18b.

Process 50 receives the data (56). For example, the receiver 18b receives the data from the transmitter 16a. Process 50 determines a count (58). For example, the receiver 18b determines the count of the number of packets of data received from the transmitter 16a. Process 50 determines a suggest mode (60). For example, the receiver 18b determines the suggested mode that the transmitter 16a should send data back to the receiver 18b.

Process 50 sends the suggested mode and the count (66). For example, the receiver 18b sends the suggested mode and the count within the control packets to the transmitter 16a using the control mode.

Process 50 receives the suggested mode and the count (72). For example, the transmitter 16a receives the suggested mode and the count from the receiver 18b. Process 50 determines a pending mode to transmit data (80). The pending mode refers to the mode that the transmitter will use to transmit data next. For example, the transmitter 16a determines the pending mode based on the suggested data rate and the count. Process 50 sends data at the pending mode (52). For example, the transmitter 16a sends data to the receiver 18b at the pending mode.

Figure 3:
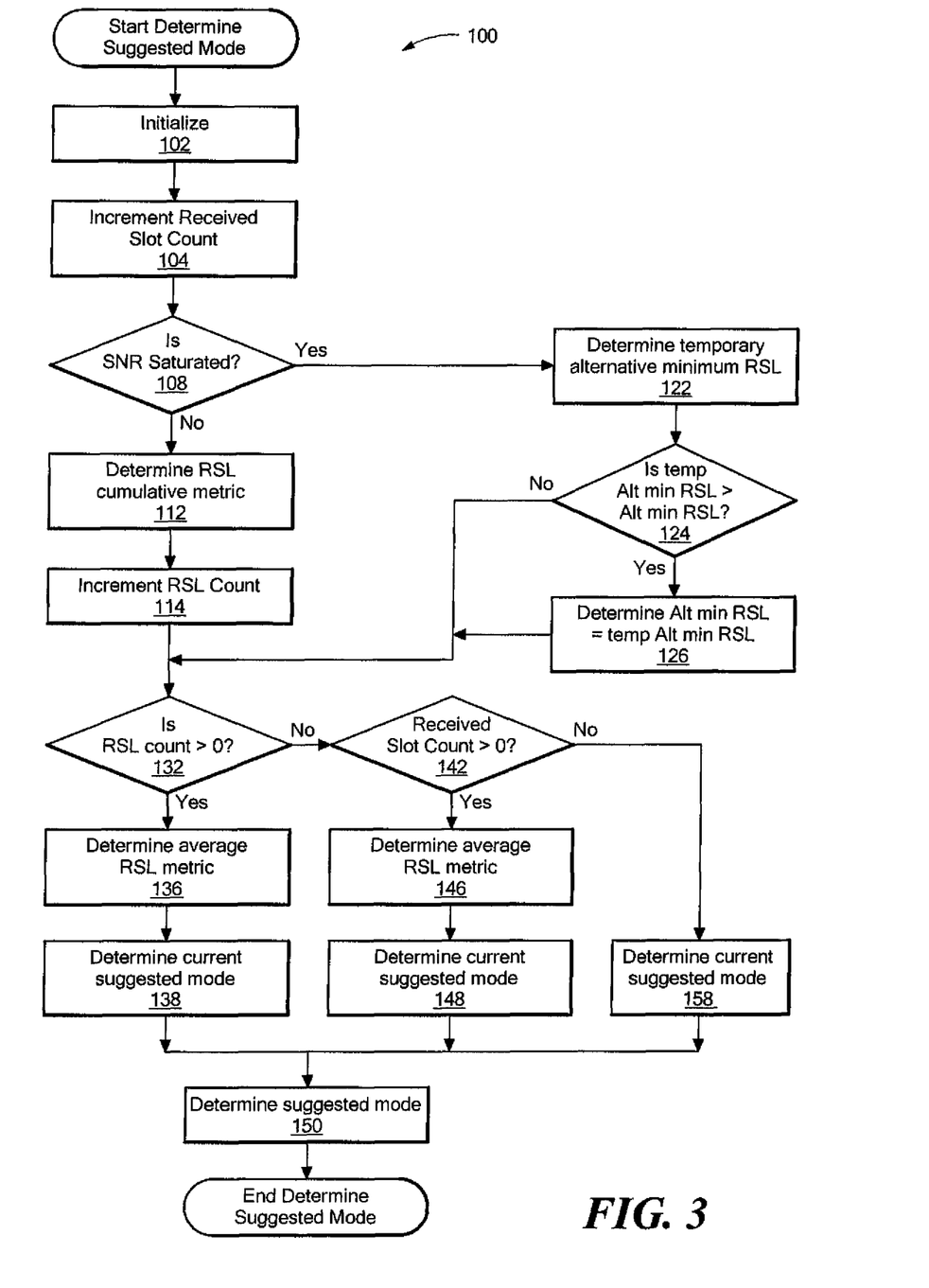
FIG. 3 is a flowchart of a process to determine a suggested mode.

Referring to FIG. 3, an exemplary process for determining the suggested mode (60) is a process 100. In process 100, a suggested mode is determined which corresponds to a suggested data rate. The suggested mode may also correspond to a waveform and bandwidth. For example, in Table I, a mode corresponds to a data rate, a waveform, and a bandwidth.

As used herein and in particular the processes described, for a given allocated bandwidth, a particular mode (e.g., the suggested mode, the pending mode, the current mode and so forth) is represented by a mode ID. For example, if a pending mode for a 1.2 MHz bandwidth has a mode ID of 1, then the pending mode is a W1 (see Table II) which corresponds to a Walsh5 waveform, 1 section, having a 680 rate (bits per slot) (see Table I).

Process 100 initializes values (102). For example, a Required Signal Level (RSL) count, a received slot count, an RSL cumulative metric and an alternative minimum RSL value are set to zero. The RSL count is a count of the number of timeslots of data used to compute an average RSL value. The average RSL value is the average RSL of data received.

The received slot count is a count of the number of slots of data received from a given receiver. The RSL cumulative metric is an accumulated value of RSL used in determining the average RSL value. The alternative minimum RSL value is the largest estimated RSL value when the SNR value is saturated.

A current mode is set to 1. The current mode is the current transmission mode in use over the link. In one example, the current mode of 1 corresponds to a Mode ID of 1 in Table II for a given bandwidth frequency. For example, if a current mode for a 6.0 MHz bandwidth has a mode ID of 1, then the current mode is a W1 (see Table II) which corresponds to a Walsh5 waveform, 1 section, having a 680 rate (bit per slot) (see Table I).

A transmit quality value is set equal to an N transmit quality value minus one. The transmit quality value is a measure of the transmit quality for data transmission based on reliability. The N transmit quality value is a number of link quality states on the data transmission mode. In one example, the N transmit quality is 4.

Process 100 increments the received slot count (104). For example, the received slot count is incremented by 1.

Process 100 determines if a SNR value indicates saturation (108). For example, the SNR value of a received signal is compared to a SNR saturation value and if a received signal has an SNR value which is less than the SNR saturation value, the received signal is not saturated. The SNR saturation value is an expected saturation point of SNR measurement from the modem as a function of the waveform mode. For example, the SNR saturation value is 14 dB for Walsh5, BPSK and QPSK waveforms.

If the received signal has an SNR value less than the SNR saturation value, process 100 determines the RSL cumulative metric (112). For example, the RSL cumulative metric is determined by taking the sum of the RSLi value and the SNR value less a minimum SNR value. The RSLi value is determined, for example, from Table I of minimum RSL relative to control required to meet $10^{-5}$ bit error rate (BER). The minimum SNR is a minimum SNR value required to meet the $10^{-5}$ BER (e.g., the RSLi column of Table II).

Process 100 increments the RSL count (114). For example, the RSL count is incremented by 1.

If the received signal has a SNR value which is greater than the SNR saturation value, process 100 determines a temporary alternative minimum RSL value (122). The temporary alternative saturation minimum RSL value is a current value of an estimated minimum RSL when the SNR value is saturated. The temporary alternative minimum RSL value is determined by adding the RSLi value with SNR saturation value less the minimum SNR.

Process 100 determines if the temporary alternative minimum RSL value is greater than the alternative minimum RSL value (124). If the temporary alternative minimum RSL value is greater than the alternative minimum RSL value, process 100 sets the alternative minimum RSL value equal to the temporary alternative minimum RSL value (126).

Process 100 determines if the RSL count is greater than zero (132). For example, process 100 is determining if there is valid data available in determining the average RSL metric. If the RSL count is greater than zero, process 100 sets the average RSL metric (136). For example, the average RSL metric is equal to the RSL cumulative metric divided by the received slot count. Process 100 sets the current suggested mode (138). For example, the current suggested mode is set to a maximum mode for which the average RSL metric less an SNR margin is greater than the RSLi. The maximum mode is a Mode ID of the highest data rate mode (number of modes). For example, in Table II, the maximum mode varies depending on the bandwidth allocation (e.g., for 1.2 MHz, the maximum mode is 3 and for 7.2 MHz, the maximum mode is 7). The SNR margin is a buffer to ensure robust data control. In one example, the SNR margin is 1 dB.

If the RSL count is not greater than zero, process 100 determines if the received slot count is greater than zero (142). If the received slot count is greater than zero, process 100 sets the average RSL metric (146). For example, the average RSL metric is set to an alternative minimum RSL value. Process 100 sets the current suggested mode (148). For example, the current suggested mode is set to the maximum mode for which the average RSL metric less the SNR margin is greater than the RSLi (e.g., in Table II, if the RSL metric less than the SNR margin is greater than the RSLi for a given bandwidth allocation).

If the received slot count is not greater than zero, process 100 sets the current suggested mode (158). For example, the current suggested mode is set equal to the current suggest mode used in a previous GPS interval (e.g., a previous one second interval).

Process 100 determines the suggested mode (150). For example, the suggested mode is determined to be equal to the minimum current suggested mode over the past N number of hysteresis epochs, where an epoch is a period comprising multiple time slots, (e.g., 1 second). In one example, N is equal to 4.

Referring to FIGS. 4A-4D, an exemplary process for determining the pending mode (80) is a process 200.

Figure 4A:
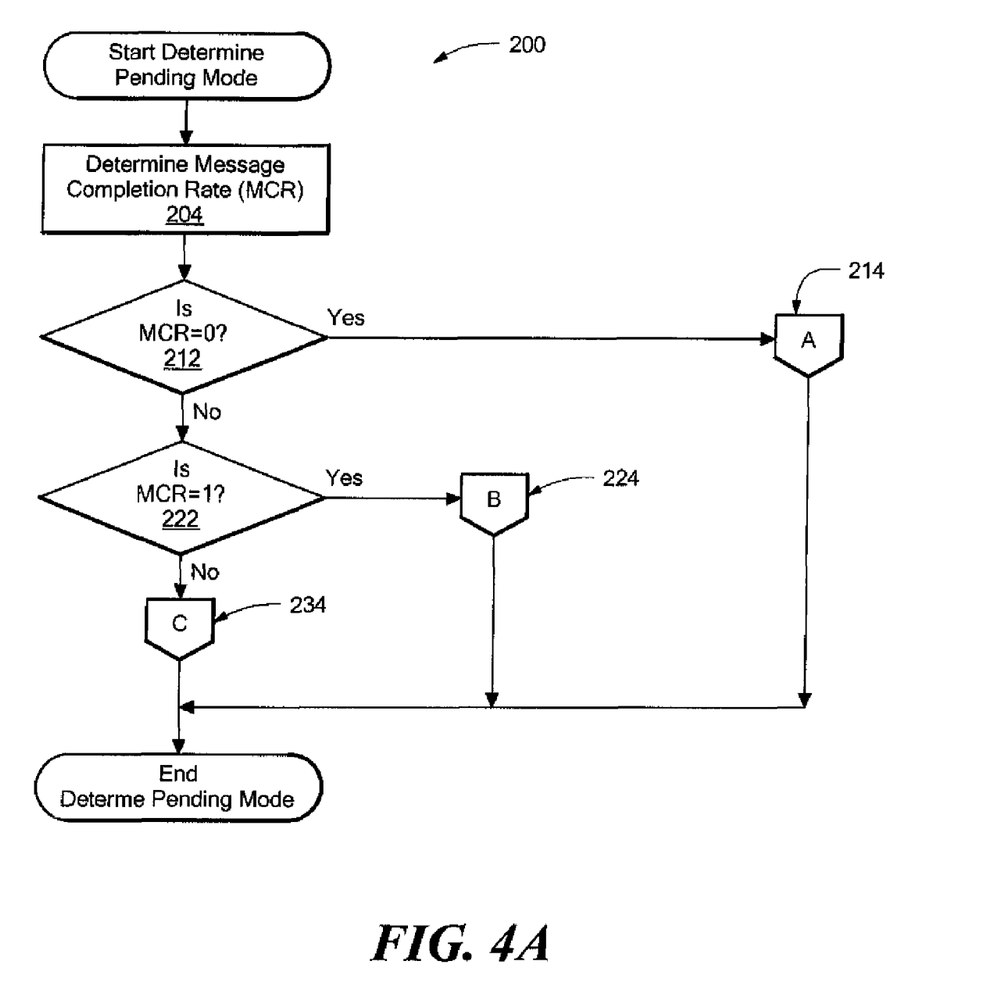
FIGS. 4A to 4D are flowcharts of a process to determine a pending mode.

Process 200 determines a message completion rate (MCR) (204). The MCR is determined using packet counts at the transmitter and the receiver for the same period of time. Those packets for which the receiver is the intended recipient are included in the count. For example, each individual packet included in a slot for which the receiver is an intended recipient is counted even though there may be many packet counts per slot of data received intended for other receivers.

In one example, the MCR is a flag having three values. The MCR equal to "0", represents that there is insufficient transmission to determine reliability and not to use the reliability in determining a mode. The MCR equal to "1" represents good reliability. The MCR equal to "1" represents poor reliability.

Process 200 determines if the MCR is equal to 0 (212). In one example, if the data packets transmitted by the transmitter are less than a minimum number of packets, the MCR is 0. In one example, the minimum number of packets is 10.

If process 200 determines that MCR is equal to zero, process 200 performs a process 214 (see FIG. 4B), for example. Process 214 determines if the suggested mode is less than or equal to the current mode (302). If the suggested mode is less than or equal to the current mode, process 214 sets the pending mode to the suggested mode (308), If the suggested mode is not less than or equal to the current mode, process 214 determines if the transmit quality value is greater than or equal to the N transmit quality minus 1 (312).

Figure 4B:
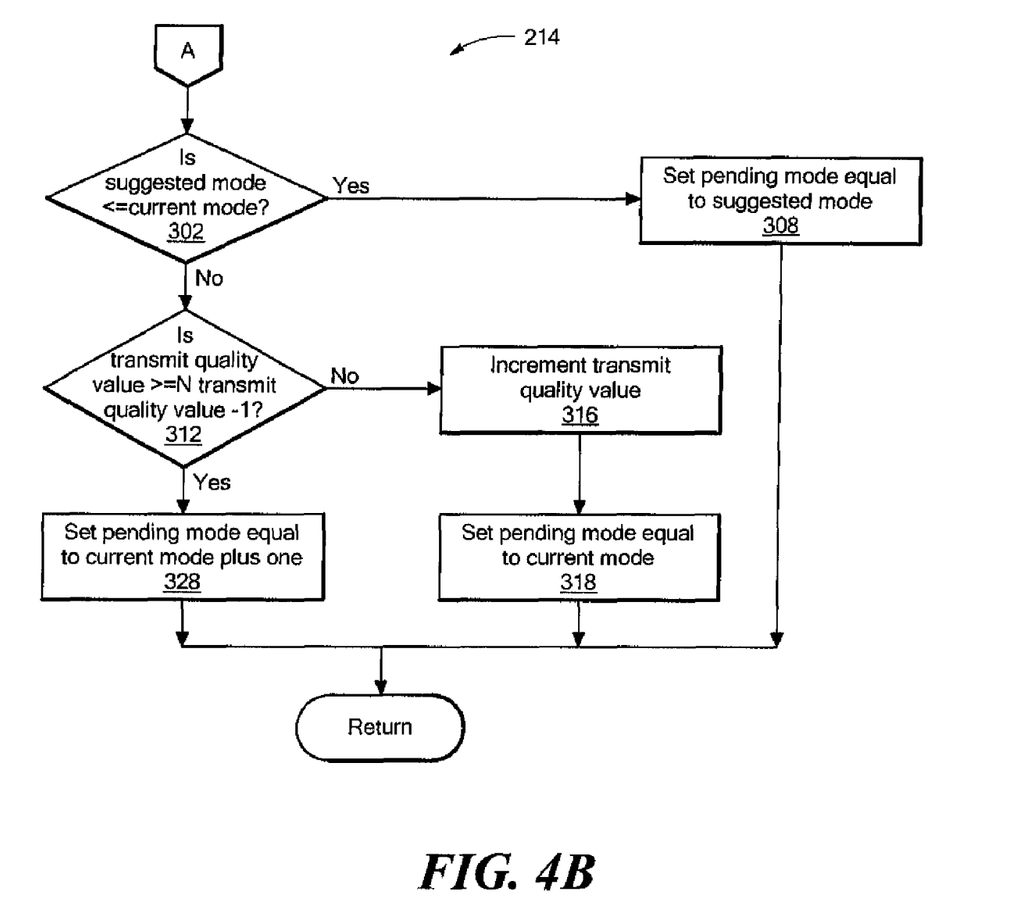

If the transmit quality value is not greater than or equal to the N transmit quality value minus 1, process 214 increments the transmit quality value (316). For example, the transmit quality is incremented by one. Process 214 sets the pending mode equal to the current mode (316).

If the transmit quality is greater than or equal to the N transmit quality value minus 1, process 214 sets the pending mode equal to the current transmit mode plus one (328). For example, for a 2.4 MHz bandwidth, increasing the mode ID from 4 to 5 or from BPSK, 2 sections (B2) to QPSK, 2 sections (Q2) in Table II.

If the MCR is not equal to 0, process 200 determines if the MCR is equal to 1 (222). For example, if the data packets received at the receiver divided by the data packets transmitted by the transmitter, is greater than a target reliability value, the MCR is 1. In one example, the target reliability value is 0.95.

If process 200 determines that the MCR is equal to one, process 200 performs a process 224 (see FIG. 4C), for example.

Figure 4C:
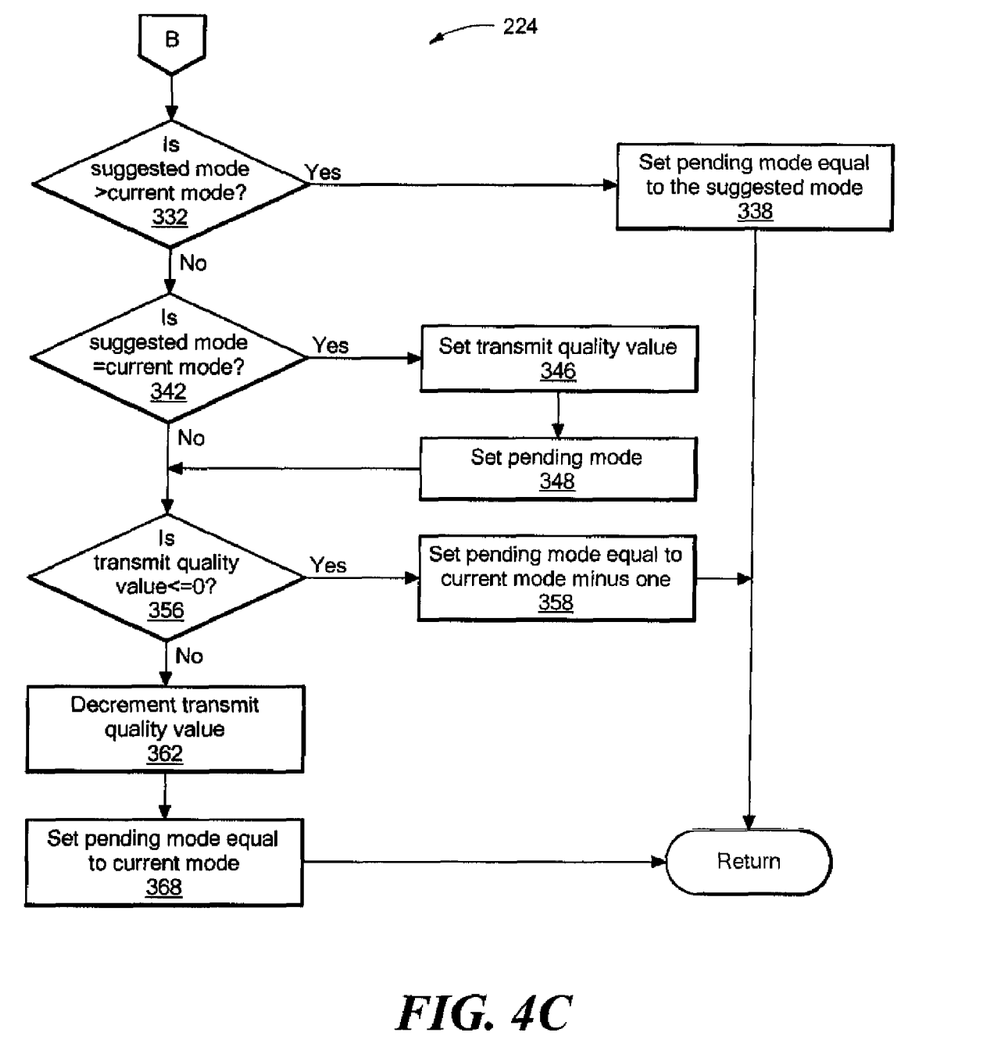

Process 224 determines if the suggested mode is greater than the current mode (332). If the suggested mode is greater than the current mode, process 224 sets the pending mode equal to the suggested mode (338).

If the suggested mode is not greater than the current mode, process 224 determines if the suggested mode is equal to the current mode (342). If the suggested mode is equal to the current mode, process 224 sets the transmit quality value (346). For example, the transmit quality value is set equal to the minimum of: the transmit quality value plus 1, and the N transmit quality value minus 1.

Process 224 sets the pending mode equal to the current mode (348).

If the suggested transmit mode is not equal to the current mode, process 224 determines if the transmit quality is less than or equal to zero. If the transmit quality is less than or equal to zero, process 224 sets the pending mode equal to the current mode less one (358). For example, for a 2.4 MHz bandwidth, reducing the mode ID from 5 to 4 or from QPSK, 2 sections (Q2) to BPSK, 2 sections (B2) in Table II.

If the transmit quality value is not less than or equal to zero, process 224 decrements the transmit quality value (362). For example, the transmit quality value is decremented by one.

Process 224 sets the pending mode equal to the current mode (368).

If process determines that the MCR does not equal one, process 200 performs a process 234 (see FIG. 4D), for example.

Figure 4D:
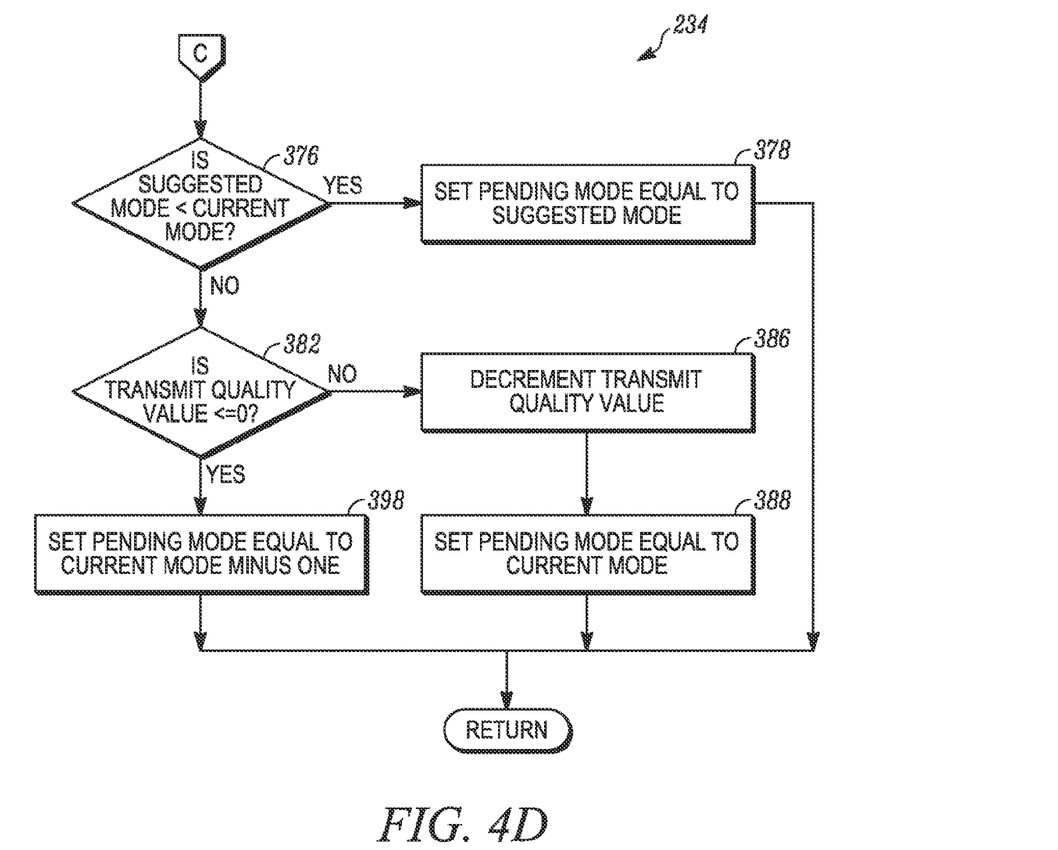

Process 234 determines if the suggested mode is less than the current mode (376). If the suggested mode is less than the current mode, process 234 sets the pending mode equal to the suggested mode (378).

If the suggested mode is not less than the current mode, process 234 determines if the transmit quality value is less than or equal to zero (382). If the transmit quality value is less than or equal to zero, process 234 sets the pending mode equal to the current mode minus one. In one example, in Table II, for 1.2 MHz, reducing the mode ID from 3 to 2, or from QPSK, section 1 (Q1) to BPSK, section 1 (B1).

If the transmit quality value is not less than or equal to zero, process 234 decrements the transmit quality value (386). For example, the transmit quality value is decremented by one. Process 234 sets the pending mode equal to the current mode (388).

In one example, the following pseudo code my be used to determine a suggested mode:

```
For each slot of data or control received:
    received_slot_count += 1;
    if EbN0_received<EbN0_SATURATION(received_mode);
        rsl_cumulative_metric += RSLi(received_mode) + EbN0_received - MIN_EbN0(received
            mode);
        rsl_count += 1;
    else                    //EbN0 may be saturated; do not include in average
        temp_alt_min_rsl = RSLi(received_mode) + EbN0_SATURATION(received_mode) -
            MIN_EBN0(received_mode);
        if temp_alt_min_rsl>alternative_minimum_rsl
            alternative_minimum_rsl = temp_alt_min_rsl
if rsl_count > 0             //Valid data in average
    average_rsl_metric = rsl_cumulative_metric/received_slot_count;
    current_suggested_mode = maximum mode for which (average_rsl_metric - SNR_MARGIN) >
        RSLi
elseif received_slot_count > 0       //No valid data in average, use Eb/No saturated data
    average_rsl_metric = alternative_minimum_rsl;
    current_suggested_mode = maximum mode for which (average_rsl_metric - SNR_Margin) > RSLi;
else                                 //No data from neighbor
    current_suggested_mode = current_suggested_mode(from previous GPS interval)
```

In one example, the following pseudo code my be used to determine a pending mode:

```
if mcr = 0
    if suggested_mode <= current_mode
        pending_mode - suggested_mode;
    elseif transmit_quality >= N_TRANSMIT_QUALITY - 1
        pending_mode = current_mode + 1;
    else {                      //transmit quality not at upper limit
        transmit_quality++
        pending_mode = current_mode;
    }
elseif mcr = 1
    if suggested_mode > current_mode
        pending_mode = suggested_mode;
    elseif suggested_mode = current_mode
        pending_mode = current_mode;
        transmit_quality = min (transmit_quality + 1, N_TRANSMIT_QUALITY - 1);
    else                        //suggested_mode < current_mode
        if transmit_quality <= 0
            pending_mode = current_mode - 1;
        else                    // transmit quality not at lower limit
            transmit_quality--;
```

-continued

```
            pending_mode = current_mode;
else        //mcr = −1
    if suggested_mode<current_mode
        pending_mode = suggested_mode;
elseif transmit_quality <= 0
    pending_mode = current_mode − 1;
    else    {              //transmit quality not at lower limit
            transmit_quality−−;
            pending_mode = current_mode
            }
```

In one example, a description of the constants and variables used in the pseudo code are included in a Table III and a Table IV, respectively:

TABLE III

Constants

| Name | Description | Value | Units |
|---|---|---|---|
| EBN0_SATURATION | Expected saturation point of the SNR measurement from the modem as a function of waveform mode | 14 for Walsh5, 14 for BPSK and QPSK | dB |
| MAX_MODE | Mode ID of the highest data rate mode (number of modes) | Varies depending on BW allocation (3–7) | unitless integer |
| MIN_EBN0 | Minimum SNR value required to meet $10^{-5}$ BER as a function of waveform mode | 6.7 for Walsh5, 5.0 for BPSK and QPSK | dB |
| N_TRANSMIT_QUALITY | Number of Link Quality States on the Data Transmission Mode | 4 | unitless integer |
| RSLi | Table of minimum RSL (relative to control) required to meet $10^{-5}$ BER | RSLi (dB) of Table II | dB |
| SNR_MARGIN | Buffer to ensure robust data control | 1.0 | dB |

TABLE IV

Variables

| Name | Description | Source | Units |
|---|---|---|---|
| alternative_minimum_rsl | Largest estimated minimum RSL when Eb/N0 value may be saturated | Receiver | dB |
| average_rsl_metric | Average RSL of data received | Receiver | dB |
| current_suggested_mode | Mode supported by the RSL at the most recent epoch. | Receiver | unitless integer |
| current_mode | Current transmission mode in use over the link | Transmitter | unitless integer |
| data_packets_received | Number of data packets received over link in most recent data mode | Receiver | unitless integer |
| data_packets_transmitted | Number of data packets transmitted over link in most recent data mode | Transmitter | unitless integer |
| gps_synch_bit | Least significant bit of GPS time of control data | Receiver | unitless integer |
| pending_mode | Pending transmission mode for link | Transmitter | unitless integer |
| received_mode | Maximum data rate mode ID received during GPS interval | Receiver | unitless integer |
| received_slot_count | Count of the number of slots of data received from a given neighbor | Receiver | unitless integer |
| rsl_count | Count of the number of slots of data used to compute the average RSL value | Receiver | unitless integer |
| rsl_cumulative_metric | Accumulated value of RSL to be used in average | Receiver | dB |
| temp_alt_min_rsl | Current value of estimated minimum RSL when SNR value may be saturated | Receiver | dB |

TABLE IV-continued

Variables

| Name | Description | Source | Units |
|---|---|---|---|
| MCR | Flag with values +1 (good), 0 (insufficient data), and −1 (bad) | Transmitter | unitless integer |
| EbN0_received | SNR measurement for each data packets received over link | Receiver | dB |
| suggested_mode | Minimum of the current suggested mode over the hysteresis time | Receiver | unitless integer |
| transmit_quality | Measure of the link quality for data transmission (based on reliability) | Transmitter | unitless integer |

Figure 5:
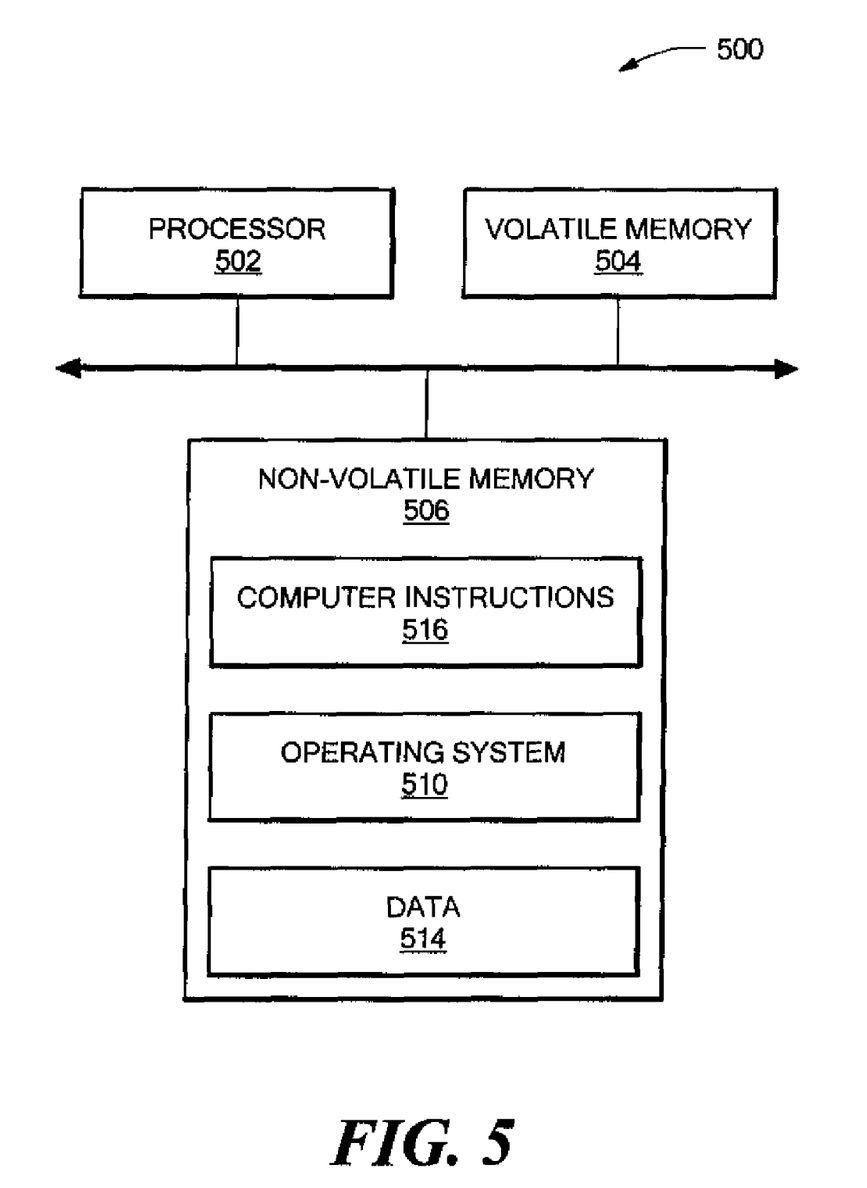
FIG. 5 is a block diagram of a computer system on which the process of FIG. 2 may be implemented.

FIG. 5 shows a computer 500, which may be used to execute all or part of process 50. Computer 500 includes a processor 502, a volatile memory 504 and a non-volatile memory 506 (e.g., hard disk). Non-volatile memory 506 includes an operating system 510, data 514, and computer instructions 516 which are executed out of volatile memory 504 to perform process 50 or portions of process 50.

Process 50 is not limited to use with the hardware and software of FIG. 5; it may find applicability in any computing or processing environment and with any type of machine or set of machines that is capable of running a computer program. Process 50 may be implemented in hardware, software, or a combination of the two. Process 50 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 50 and to generate output information.

The system may be implemented, at least in part, via a computer program product, (i.e., a computer program tangibly embodied in an information carrier (e.g., in a machine-readable storage device or in a propagated signal)), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 50. Process 50 may also be implemented as a machine-readable storage medium, configured with a computer program, where upon execution, instructions in the computer program cause the computer to operate in accordance with process 50.

The processes described herein are not limited to the specific embodiments described herein. For example, the processes are not limited to the specific processing order of the processing blocks in FIGS. 2, 3 and 4A to 4D. Rather, any of the processing blocks of FIGS. 2, 3 and 4A to 4D may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Processing blocks in FIGS. 2, 3 and 4A to 4D associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method, comprising:
   transferring data at an initial mode from a transmitter to a receiver;
   determining a suggested mode based on the data transferred;
   determining a count of the data transferred from the transmitter to the receiver; transferring the suggested mode and the count to the transmitter; and determining a pending mode based on the suggested mode and the count,
   wherein determining the suggested mode comprises determining if a signal, including the data, has a signal-to-noise ratio indicating saturation, and wherein determining the suggested mode further comprises determining a current suggested mode for each N number of hysteresis epochs, the suggested mode to be equal to a minimum current suggested mode over the past N number of hysteresis epochs.

2. The method of claim 1 wherein determining the suggested mode comprises determining a suggested data rate.

3. The method of claim 1 wherein determining the suggested mode comprises determining a waveform.

4. The method of claim 1 wherein determining the pending mode comprises determining a pending data rate.

5. The method of claim 1 wherein determining the pending mode comprises determining a waveform.

6. The method of claim 1 wherein determining the pending mode comprises determining a message completion rate.

7. The method of claim 6 wherein determining the pending mode comprises comparing the initial mode to the suggested mode.

8. A communications system to determine a mode to transmit data, comprising:
- a receiver comprising circuitry configured to: determine a suggested mode based on data received; determine a count of the data transferred to the receiver; send the suggested mode and the count to a transmitter; and
- the transmitter comprising circuitry configured to: send the data at an initial mode; and determine a pending mode based on the suggested mode and the count, wherein the circuitry of the receiver configured to determine the suggested mode comprises circuitry configured to determine if a signal, including the data, has a signal-to-noise ratio indicating saturation, and wherein the circuitry of the receiver configured to determine the suggested mode further comprises circuitry configured to determine a current suggested mode for each N number of hysteresis epochs, the suggested mode to be equal to a minimum current suggested mode over the past N number of hysteresis epochs.

9. The system of claim 8 wherein the circuitry of the transmitter and the circuitry of the receiver comprise at least one of a processor, a memory, programmable logic and logic gates.

10. The system of claim 8 wherein the circuitry of the receiver configured to determine the suggested mode comprises circuitry configured to determine a suggested data rate.

11. The system of claim 8 wherein the circuitry of the receiver configured to determine the suggested mode comprises circuitry configured to determine a waveform.

12. The system of claim 8 wherein the circuitry of the transmitter configured to determine the pending mode comprises circuitry configured to determine a pending data rate.

13. The system of claim 8 wherein the circuitry of the transmitter configured to determine the pending mode comprises circuitry configured to determine a waveform.

14. The system of claim 8 wherein the circuitry of the transmitter configured to determine the pending mode comprises circuitry configured to determine a message completion rate.

15. The system of claim 14 wherein the circuitry of the transmitter configured to determine the pending mode comprises circuitry configured to compare the initial mode to the suggested mode.

16. A transmitter, comprising:
circuitry configured to:
- send data at an initial mode to a receiver;
- determine a pending mode based on a suggested mode and a count of the data received from the receiver, wherein the circuitry configured to determine the suggested mode comprises circuitry configured to determine if a signal, including the data, has a signal-to-noise ratio indicating saturation, and wherein the circuitry configured to determine the pending mode further comprises circuitry configured to determine a current suggested mode for each N number of hysteresis epochs, the pending mode to be equal to a minimum current suggested mode over the past N number of hysteresis epochs.

17. The transmitter of claim 16 wherein the circuitry comprises at least one of a processor, a memory, programmable logic and logic gates.

18. The transmitter of claim 16 wherein the circuitry configured to determine the pending mode comprises circuitry configured to determine a pending data rate.

19. The transmitter of claim 16 wherein the circuitry configured to determine the pending mode comprises circuitry configured to determine a waveform.

20. The transmitter of claim 19 wherein the circuitry configured to determine the pending mode comprises circuitry configured to determine a message completion rate.

21. The transmitter of claim 20 wherein the circuitry configured to determine the pending mode comprises circuitry configured to compare the initial mode to the suggested mode.

22. A receiver, comprising:
circuitry configured to: determine a suggested mode based on data received from a transmitter; determine a count of the data received from the transmitter; and send the suggested mode and the count to the transmitter, wherein the circuitry configured to determine the suggested mode comprises circuitry configured to determine if a signal, including the data, has a signal-to-noise ratio indicating saturation, and wherein the circuitry configured to determine the suggested mode further comprises circuitry configured to determine a current suggested mode for each N number of hysteresis epochs, the suggested mode to be equal to a minimum current suggested mode over the past N number of hysteresis epochs.

23. The receiver of claim 22 wherein the circuitry comprises at least one of a processor, a memory, programmable logic and logic gates.

24. The receiver of claim 22 wherein the circuitry configured to determine the suggested mode comprises circuitry configured to determine a suggested data rate.

25. The receiver of claim 24 wherein the circuitry configured to determine the suggested mode comprises circuitry configured to determine a waveform.

26. An article comprising a machine-readable medium that stores executable instructions to determine a mode to transmit data, the instructions causing a machine to:
- transfer data at an initial mode from a transmitter to a receiver;
- determine a suggested mode based on the data transferred;
- determine a count of the data transferred from the transmitter to the receiver;
- transfer the suggested mode and the count to the transmitter; and
- determine a pending mode based on the suggested mode and the count, wherein the instructions further cause the machine to determine if a signal, including the data, has a signal-to-noise ratio indicating saturation, and wherein the instructions further cause the machine to determine a current suggested mode for each N number of hysteresis epochs, the suggested mode to be equal to a minimum current suggested mode over the past N number of hysteresis epochs.

27. The article of claim 26 wherein the instructions causing the machine to determine the pending mode comprises instructions causing the machine to determine a message completion rate and to compare the initial mode to the suggested mode.

* * * * *